Patented June 4, 1935

2,003,292

UNITED STATES PATENT OFFICE 2,003,292

METHOD OF AND APPARATUS FOR REGULATING CONSTANT VOLUME EXPLOSION CHAMBERS

Hans Holzwarth, Dusseldorf, Germany, assignor to Holzwarth Gas Turbine Co., San Francisco, Calif., a corporation of Delaware Application October 21, 1931, Serial No. 570,106
In Germany October 30, 1930

13 Claims. (Cl. 60—41)

Amongst the various methods of regulating constant volume explosion chambers such as are employed in particular for the operation of explosion turbines, methods of regulation are known whereby the number of the cycles of operation per unit of time and per explosion chamber are altered. Two such ways of altering the total number of working cycles per unit of time or per chamber have been proposed. Either only the speed of revolution of the controlling shaft per unit of time was altered and all the individual phases of a working cycle, namely the duration of working periods of combustion (explosion), expansion, and charging, were thereby uniformly increased or decreased correspondingly; or the operation of the individual explosion chambers was temporarily delayed, that is to say pauses of a duration of one or more working cycles were introduced between individual working cycles which themselves remained unchanged. Neither method of regulation was entirely satisfactory. With the first, relatively very simple method of regulation there was the drawback that all the individual phases of a working cycle were altered to an equal degree, although the duration of certain of these phases, particularly the explosion and expansion phases, is, in fact, entirely independent of the load conditions, of the turbine at any particular time. Further, with the shortening or lengthening of all the individual phases, effects were produced which were directly opposed to those to be obtained, so that special additional arrangements were necessary in order to neutralize the undesired effect or to act in the opposite direction. Thus, for example, if with increasing load an acceleration of the succession of the individual phases and therefore of the cycles of operations per unit of time occurred, owing to the speed of revolution of the controlling shaft being increased, the duration of the inlet of the fuel into the explosion chamber filled with air was shortened so that as the load increased the mixture became impoverished. Apparatus was therefore necessary for increasing the pressure at which the fuel, such as gas, was introduced into the explosion chamber in correspondence with the increase in the number of the cycles of operation per unit of time in order to ensure that the composition of the mixture remained uniform. The second method of regulation, in which the operation of one or more explosion chambers was temporarily wholly delayed had the disadvantage of an undesired effect on the uniform running of the turbine rotor and also made difficult the starting of such chamber because of the cooling thereof during the period of idleness. This method of regulation was not sufficient. At smaller loads an auxiliary regulation of the fuel and air mixture had to be resorted to, and the regulating arrangements accordingly became complicated and a simple and effective method of regulation was not thereby obtained.

Now the object of the present invention is to provide a method of regulation which not only eliminates the disadvantages of the known methods but, when carried into effect, succeeds in keeping constant the individual phases of each working cycle independently of the number of working cycles per unit of time to which the machine has been regulated, and therefore succeeds also in keeping substantially constant the efficiency of the turbine itself independently of the conditions of regulation of the turbine. According to the present invention, a method of regulation is proposed by which the number of working cycles per unit of time and per explosion chamber is altered by the interposition of variable periods of time between the end of the expansion phase and the opening of the air valve, that is, the beginning of the scavenging phase. In contradistinction to an already proposed method of regulation by uniform variation of all the individual phases, the present method has the advantage that the individual phases or working periods remain substantially constant, and therefore has a favourable effect on the constancy of the efficiency. The term "working period" or "phase" in this connection is to be understood to mean the actual duration of the working process, that is, the duration of a combustion, expansion, scavenging, or charging (or combined scavenging and charging), without taking into account the interposed period of time according to the invention. My improved process does not operate to accentuate the degree of irregularity because the alterable periods or pauses are distributed uniformly over the working cycles of all chambers. By a suitable interposition of the pauses or periods the result can be obtained not only that the individual phases of each working cycle remain constant or substantially so, but also that the interposition of the variable periods or pauses remains practically without effect on the course of the working processes.

The nature of the invention will be better understood with the aid of the following table which distinguishes clearly between the instants which determine the beginning and the end of each of the different process phases (i. e. charging period, explosion period, expansion period, etc.), and the instants at which the control or regulating apparatus effects operation of a controlled element:

|   | Process phase | Control phase |
|---|---|---|
| 1. Charging | From nozzle valve closing to charging valve closing | Closing of nozzle valve / Closing of charging valve |
| 2. Pause (whirling) | From charging valve closing to ignition | Charging valve closing / Ignition |
| 3. Explosion | From ignition to maximum pressure | Ignition ↑ |
| 4. Pause (saddle) | From pressure maximum to nozzle valve opening | Nozzle valve opening |
| 5. Expansion | From nozzle valve opening to minimum pressure | Nozzle valve opening ↑ |
| 6. Pause | From minimum pressure to air valve opening | Air valve opening |
| 7. Scavenging | From air valve opening to arrival of air at nozzle valve | Air valve opening ↑ |
| 8. Pause (cooling) | From arrival of air at nozzle valve to nozzle valve closing | Nozzle valve closing |

The above-indicated phases may be explained as follows:

1. The process phase of charging is determined by definite control points or timed external impulses, since the charging valve, in view of the short times available, always closes before the theoretical equalization between the charging and chamber pressures.

2. During the pause between the end of the charging and the ignition there occurs an intimate mixture of the air and fuel as a result of whirling and diffusion. This phase also is determined by control points.

3. As to the process phase of explosion, only its beginning is determined by a control impulse (ignition). The end point is independent of the control, i. e. is not subject to exact control.

4. In order to insure the completion of the explosion phase (i. e. complete combustion), the control device must provide a definite pause between the end of the actual explosion and the beginning of the expansion. This pause, which is called the "saddle" from the shape of the time-pressure diagram, must have a definite duration determined by experience for definite kinds of fuel. The control phase therefore includes explosion plus saddle.

5. The process phase of expansion, like that of explosion, is determined only at its initiation by a control impulse (nozzle valve opening). The end point of the expansion phase is dependent upon the control only when the air valve is opened before the expansion is terminated.

6. If the opening of the air valve occurs only after the complete termination of the expansion, there occurs a pause which is practically without influence upon the course of the process.

7. The process phase of scavenging is determined only at its beginning by a control inpulse (air valve opening).

8. From the practical standpoint a certain excess of time had to be afforded by the control in the older gas turbine plants designed by me for the passage of air for the purpose of cooling the nozzles and blades, but in the modern machines only for the purpose of obtaining a complete scavenging of the chamber.

According to the present invention the regulation of the cycle number is accomplished in a very effective manner by variation of the pause 6. It is an important feature of the present invention that by such regulation the course of the process is practically undisturbed. If the expansion (phase 5) in the process selected by way of example occurs down to the counter pressure, phase 5 remains completely unchanged and it is immaterial how large the pause 6 is. If, on the other hand, when a somewhat different process is employed wherein the expansion upon full load (i. e. when the number of cycles/min. is at a maximum) is terminated when the pressure in the chamber reaches the charging air pressure, the latter being considerably above the counter pressure, then at such full load the pause 6 is equal to zero. If now in the course of regulation, that is when the load falls, a pause 6 is inserted, or is increased over its previous value, the expansion is no longer automatically cut off at the air charging pressure, but the final expansion pressure will approach closer and closer to the counter pressure the longer the pause 6 is and will finally reach such counter pressure. This slight influence upon the expansion is, however, practically without significance upon the process. The length of the pause or period of time is preferably such that, at the full number of working cycles per unit of time, that is to say, preferably at full load, it is equal to zero and increases correspondingly with the decrease in the number of working cycles per unit of time, that is, as the load decreases.

The new method of regulation may be so carried out that the expansion phase and/or the charging phase are kept substantially constant, and to this end the counter-pressure of the explosion turbine behind the rotor has to be kept constant. As, to accomplish such result, only the amount but not the pressure, of the exhaust gases discharging from the explosion turbine per unit of time should be permitted to alter, a continuous current turbine which may in some cases be connected after the explosion turbine must have a regulation, and preferably a nozzle regulation, in order to be able to operate with practically constant efficiency. Such method of regulation requires further that, on regulating the number of cycles per unit of time while the number of chambers operating remains unaltered, the charging air delivered by the compressor should vary in amount, but with no substantial change in pressure. A centrifugal compressor is preferably employed as such machine has the characteristic that within selected limits it will deliver air at substantially constant pressure irrespective of changes in the amounts of air delivered by it, whereby the speed of revolution of the compressor can remain constant, so that, for example, it becomes possible to arrange it on the same shaft as that from which the electrical generator or other output machine of constant speed is driven. Finally, there is the possibility of maintaining constant the heat content per unit volume of the explosive mixture or of altering it only within narrow limits, since the phases are kept constant.

The apparatus for carrying the method into effect will depend on the particular manner of operation selected. Since the end of the expansion depends on the beginning of the expansion, that is to say, on the opening of the nozzle or exhaust valve, it being assumed that the magnitudes of all other quantities which affect it remain unaltered, in carrying out the method in accordance with one embodiment of the invention the regulation of the nozzle valve and charging air valve will be undertaken in order to alter the pauses, which have to be variable from zero to a maximum, between the end of the expansion of the combustion gases in the explosion chamber and the opening of the charging air valve. A regulating device constructed in accordance with the invention is thus characterized, in general, by arrangements for varying the angular advance or retardation of certain of the effective controlling points or instants at which control is initiated or stopped, and embodied in a controlling member such as a hydraulic distributor. The controlling points can be determined by a mechanical, hydraulic, pneumatic or electric regulating apparatus. If a pressure medium is employed for regulating the controlled members or valves of explosion chambers, as described in my United States Patent No. 877,194, a particularly simple form of construction of the regulating apparatus results when the rotating distributor, described more fully herein below, is made movable axially and the controlling points lie in the edges of a helical block or enlargement on such distributor by the axial displacement of which the advance or retardation of the controlling edges in relation to the rotary movement of the distributor can be varied. In such case the pitch of the controlling edges is determined by the length of the regulating stroke (which is selected from a practical point of view) and by the distance apart, reduced to the periphery of the distributor, of similar individual phases of each two successive working cycles, taking into account the total variations within the range of regulation in the number of the cycles of operation per unit of time. The invention includes also the kinematic reversal of this apparatus, i. e. the holding stationary the heretofore rotating distributor and rotating the heretofore stationary casing of this apparatus. Preferably the spiral blocks are arranged axially one behind another on the distributor corresponding to the type of member to be actuated by the pressure medium. Among the individual phases which are to be controlled as respects their moments of beginning or ending in accordance with the invention, expansion or its ending and charging with air or its beginning have already been mentioned. The individual phase of the admisson of fuel is also altered, as regards the moments at which it begins and ends, by the interposition of a longer or shorter pause or interval of time. It is obvious that an inclined or spiral controlling block may be provided on the distributor for varying the instant of operation of the fuel feeding device, such as a plunger, by the pressure medium and for controlling the pressure medium, in the manner already described in connection with the nozzle valve and charging air valve.

In the operation of explosion chambers it is often necessary to adjust the control of the turbine to a particular fuel and, for example, to increase the periods within which the combustion gases remain in the explosion chamber under the highest (i. e. explosion) pressure and under the highest temperature, in order that the operation of the chamber may be carried out with difficultly ignitable fuel. In order to ensure that this may also be possible with the construction of the controlling members in accordance with the invention, there are arranged, preferably between the casing for the connections of the conduits for the pressure medium and the distributor, adjustable bushes through the agency of which the moments of inlet and outlet of the pressure medium are adjustable in common and in a similar manner for each kind of controlled member to be actuated. In the case mentioned, for example, the bush which encloses the section of the distributor for the nozzle valve would be displaced slightly in the direction of rotation of the distributor, so that the nozzle valves of all chambers open somewhat later than in the original position of the bush. Thus the period during which the combustion gases are under the highest combustion pressure in the explosion chamber, that is to say, the duration of the peak in the pressure time diagram, is increased, whereby there is produced in the explosion chamber a temperature condition, i. e. raising of the temperature of the mixture before ignition, such that operation with difficultly ignitable fuels, such as coal dust for example, can be carried out. The invention comprises also the production of other effects by the employment of adjustable bushes as will be described below. The invention contemplates also the provision of means for effecting the movement of the bushes automatically in dependence on certain other variable factors in the working of the turbine.

My invention will now be described with the aid of the accompanying drawings, in which.

Figures 1, 16:
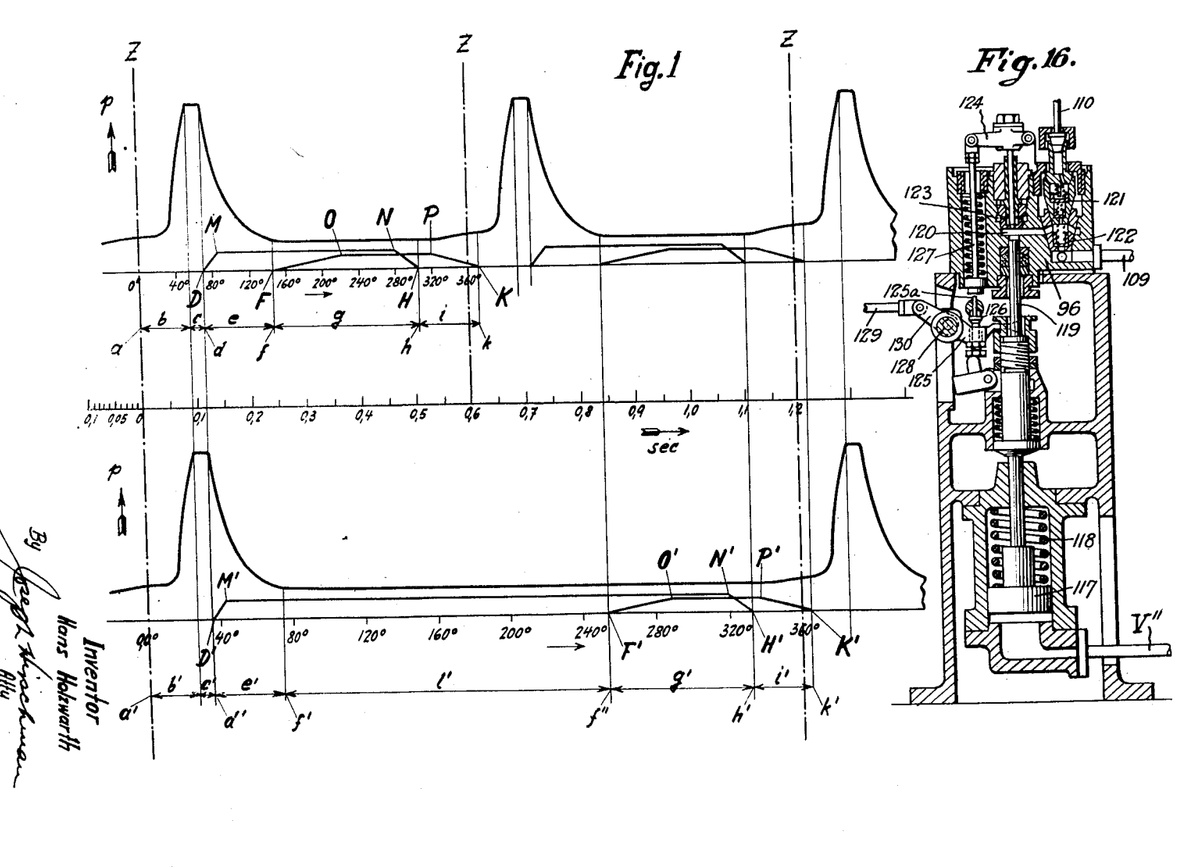
Fig. 1 shows a pressure-time diagram of an explosion chamber operating with the maximum number of cycles, and beneath it a pressure-time diagram for a chamber regulated in accordance with the present invention, the abscissae representing also the angular displacement of the controlling shaft, the shaft in the lower diagram rotating at half the speed of that of the upper diagram.
Fig. 16 shows a section through the fuel pump shown in Figs. 9 and 10.

Referring to the drawings, in Fig. 1 the upper diagram shows the typical operating process of a constant volume explosion chamber. In this diagram the ordinates represent pressures, while the abscissae represent time and also the rotation or angular displacement of the controlling shaft; one revolution of the controlling shaft is represented as equal to 360°. Between each two ordinate axes Z—Z there is a full cycle of operations. With the controlling shaft in the position 0° ignition takes place at the point $a$. Referring to the upper diagram, which represents the chamber as operating under the maximum number of cycles, explosion and combustion take place in the chamber during the rotation $b$ of the shaft of the regulating mechanism. This is followed by the peak period of substantially uniform maximum pressure $c$ until at the point $d$ the nozzle valve opens. During the rotation $e$ of the shaft the combustion gases expand. As soon as the pressure of the expanding combustion gases in the explosion chamber has fallen to at least the pressure of the charging air, the air valve opens at the point $f$ and the nozzle valve being kept open, the residual combustion gases are driven out during the rotation $g$ of the shaft. The nozzle valve closes at the point $h$, while the introduction of fuel begins while the charging air valve is still open. At the point $k$ the charging air valve closes so that it was open altogether during the rotation of the shaft for the interval $g+i$. At the point $a$ the next cycle of operations begins by the ignition of the mixture which has already been formed in the chamber. The upper diagram in Fig. 1 corresponds to a cycle of operations of which the number is 100 per minute which, according to the example selected, corresponds to the normal output of the explosion chamber or of the explosion turbine. Now, in accordance with the preferred mode of carrying out the invention, a constant volume explosion chamber operating in the manner just described, or in any other suitable manner is to be so regulated that, in carrying out the regulation, the number of the working cycles per unit of time and per chamber is altered, on the one hand without the individual phases $b$, $c$, $e$, $g$ and $i$ of a cycle being altered to any considerable degree and on the other hand without substantially influencing the operating process. The maintaining of the separate phases of the cycle substantially invariable, i. e. the combustion or explosion represented by the length $b+c$, the expansion represented by the length $e$, and the charging represented by the length $g+i$, has the advantage that the efficiency, which is an optimum at normal loading (full load) owing to proper course of the individual phases, remains practically unchanged at the optimum value independently of the conditions of regulation of the explosion chamber or of the turbine. A particularly advantageous way of carrying out the regulating method in accordance with the invention, whereby all the advantages mentioned are secured is characterized by the interposition of a variable period of time between the moment when the expansion of the combustion gases in the chamber ends and the moment when the charging air valve begins to open. A mode of operation according to such method is represented by the lower curve in Fig. 1, wherein the interposed period is indicated by the interval $l'$, the intervals or phases $b'$, $c'$, $e'$, $g'$, $i'$ being of the same, or practically the same, duration as the phases $b$, $c$, $e$, $g$, $i$, respectively, of the upper diagram. Whereas the latter diagram represents an explosion chamber operating at a maximum number of 100 cycles per minute, the lower diagram represents the same chamber operating at 50 cycles per minute.

Figure 2:
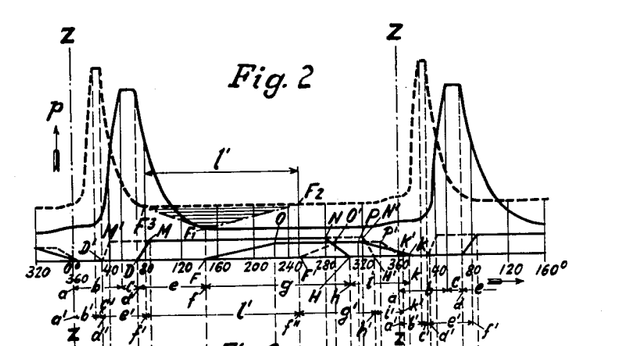
Fig. 2 shows the two diagrams of Fig. 1 drawn against angular displacements of the distributor shaft as abscissae, the curves being drawn so as to be relatively displaced in the direction of the ordinates for the sake of clearness; in the same figure the pertaining curves of the lifts of the valves are also illustrated.

In Fig. 2 the two diagrams are drawn against the same angular displacement of the controlling shaft as abscissae, the 50 cycle curve being shown in dotted lines, which, simply for the sake of clearness, is displaced relatively to the 100 cycle curve drawn in full lines in the direction of the ordinates. This shows that, since the controlling shaft only makes 50 instead of 100 revolutions per minute, the individual phases in the 50-cycle diagram appear shortened by one half, because in the time periods available for the individual phases, which remain unaltered by the conditions of regulation, since the controlling shaft rotates at half its speed at 100 cycles, the controlling shaft only makes one half the rotation measured in degrees, which it makes at one hundred working cycles per minute or at one hundred revolutions per minute in the same times. If ignition again occurs at 0° of revolution of the controlling shaft at the point $a'$ then combustion ends at the point $d'$ and expansion ends at the point $f'$. As already stated in accordance with the invention there is to be interposed between the moment when the expansion of the combustion gases in the explosion chamber ends at $f'$ and the moment when the charging air valve opens at $f''$ a period of time or pause of variable length, which at normal loading is equal to zero and increases correspondingly as the loading is reduced or correspondingly as the number of working cycles per unit of time falls. This period in the dotted diagram for 50 cycles per minute in Fig. 2 is again given by the controlling shaft revolution $l'$. Since it has been found by experience that a range of regulation of from 100–50 cycles per minute is sufficient, the controlling shaft revolution $l'$ or the period of time corresponding thereto represents the maximum value of the period, the interposition of which between the individual phases, such as $e$ and $g$ or $e'$ and $g'$, and the variability of which constitute the essence of the invention. For all conditions of regulation lying between 100 and 50 cycles per minute this period is given by the distance apart of the controlling shaft positions $f'$ and $f''$ at any time. If straight lines are drawn between the point $F'$, which indicates the end of the expansion and the opening of the air valve on the 100 cycle diagram, and the points $F^3$ and $F^2$ which indicate the end of the expansion and the opening of the air valve on the 50-cycle diagram, and if the ordinates by which the diagrams for 100 and 50 cycles per minute are displaced be divided into 50 parts, then the horizontal line drawn through each division and limited on the one hand by the line $F_1$, $F_2$ and on the other hand by the line $F_1$, $F_3$ corresponds to the period to be interposed between the individual phases at this number of cycles; or the controlling members of the explosion chamber or of the explosion turbine must be so adjusted either automatically or by hand by regulating devices in correspondence with the loading that, by the interposition of a period of the correct length between the moment when the expansion of the combustion gases in the explosion chamber ends and the moment when the charging air valve opens, the number of cycles per unit of time is regulated in such a manner that the explosion chamber or the turbine develops an output corresponding to this loading.

Figs. 1 and 2 show also the diagram of the lift of the nozzle and charging air valves for the two conditions of regulation of 100 and of 50 cycles per minute. When regulated for 100 cycles per minute the nozzle valve begins to open at the point D corresponding to the point d. At the point M the nozzle valve is fully opened. It begins to close at the point N and is fully closed at the point H. The charging air valve begins to open at the point F. At the point O the charging air valve is fully opened. This valve begins to close at the point P while at the point K it is again fully closed. These valve lift diagrams are drawn in full lines for a condition of regulation of 100 cycles, while the dotted lines in Fig. 2 represent the corresponding valve lift diagrams D', M', N', H' for the nozzle valve and F', O', P', K' for the charging air valve when regulated for 50 cycles per minute. They show therefore that the apparatus for carrying out the regulating method must be so constructed that, when it is necessary, for example, to adjust the controlled members or valves of the explosion chamber from a condition of regulation of 100 cycles per minute to a condition of regulation of 50 cycles per minute, the action on the controlling devices of the nozzle valve and of the charging air valve must be effected automatically or by hand in such a manner that the opening of the nozzle valve is advanced angularly from the point D to the point D' (which points, due to the inverse speed of rotation of the shaft, are spaced by equal time intervals from the instants of ignition), while the closing of the nozzle valve is retarded angularly from the point H to the point H', the opening of the charging air valve is retarded angularly from the point F to the point F' and the closing of the charging air valve is advanced angularly from the point K to the point K', all being with reference to degrees of revolution of the controlling shaft. Since the regulating points D, D', H, H', F, F'', K, K', owing to the contemplated rythmic method of operation of the explosion chamber, must be periodically controlled, the apparatus for carrying out the regulating method in accordance with the invention must be provided with devices for altering the advance or retardation of the effective controlling points of a controlling member with respect to the movement which effects the periodic actuation of the nozzle valve and of the charging air valve or of the other controlling members necessary for the operation of a constant volume explosion chamber.

Figure 3:
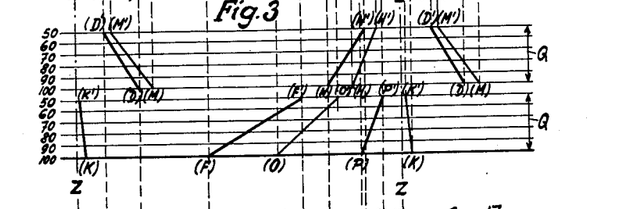
Fig. 3 illustrates diagrammatically the controlling points which an apparatus for periodically actuating the controlled members or valves of the explosion chambers must possess in order to be able to carry out the regulating method in accordance with the invention.

Fig. 3 shows the way in which the actual controlling points of the regulating apparatus must be arranged; that is to say, how the controlling devices of the nozzle valve and of the charging air valve must be influenced, when a range of regulation of from 100 to 50 cycles per minute is sufficient to equalize variations in loading. If the movement necessary for the maximum adjustment, which is to be exerted by the governor or by hand and is chosen from a practical point of view, amounts to the value Q, and if this value be divided into the numbers of cycles per minute taking place between 100 and 50, the characteristic of the actual controlling points is at once given if the pertaining opening and closing points or controlling shaft positions for the nozzle valve and the charging air valve be plotted on the horizontal lines corresponding to 50 and 100 cycles per minute and the coordinate controlling points be connected by straight lines. Thus the line D, D' over the range of regulation of from 100 to 50 cycles per minute represents the positions of the controlling shaft or the moments when the nozzle valve has to be opened if a definite fall in load is to be compensated by a definite condition of regulation, that is to say by a regulation to a definite number of cycles per minute. The line M, M' therefore gives the positions of the controlling shaft or the moments when the nozzle valve must be fully opened. The nozzle valve must begin to close in accordance with the line N, N' in order that it may be fully closed along the line H, H'. The re-opening of the nozzle valve takes place along the line D, D' in order to be completely closed along the line M, M'. Similar considerations hold good for the charging air valve. This must begin to open along the line F, F', it must be fully opened along the line O, O' and must begin to close along the line P, P' and must be fully closed along the line K, K'. Within the time areas M, M', N', N therefore the nozzle valve has to be fully opened and it must be fully closed within the time areas H, H', D', D; for the opening of such valve the time areas D, D', M' M must be taken into account and for its closing the time areas N, N', H', H. The charging air valve must be fully closed within the time areas K, K', F', F and fully opened within the time areas O, O', P', P; for opening the valve the time area F, F', O', O and for its closure the time area P, P', K', K is available. The time areas have the meaning that their horizontals for each number of cycles indicate the position of the controlling shaft or the moments of the beginning of the opening, the completed opening, the beginning of the closing and the completed closing of the valves.

A particularly simple form of construction of the regulating apparatus results when the usual control of the periodically moved regulating members (i. e. valves) is effected with a pressure medium. The control points of the controlling body need only possess the characteristic given by the lines D, D', M, M', N, N', H, H' and K, K', F, F', O, O', P, P' of Fig. 2. By constructing the controlling body throughout as a cylindrical rotary distributor of the general type disclosed in my above-mentioned United States Patent No. 877,194, its controlling points lie in the edges of spiral blocks or enlargements, by the suitable axial displacement of which the advance or retardation of the controlling edges with respect to the rotary movement of the distributor may be effected. The inclination of the controlling edges is given by the regulating stroke Q which has been arbitrarily selected, and by the distances apart of corresponding points on the pressure-angular displacement curves of different cycle frequencies, such as D and D' indicating the beginning of expansion, and F and F' indicating the beginning of air charging, transferred to the periphery of the distributor, regard being paid to the total alteration in the number of cycles of operation per unit of time included within the range of regulation, i. e. from 100 to 50 per minute. Then the distances apart of the points D and D' or F and F' reduced to, i. e. projected upon, the periphery of the distributor, in other words reduced to the rotation of the controlling shaft, themselves determine that the opening of the nozzle valve, taking into account the total range of regulation, is displaced from the position D of the controlling shaft to the position D', the closing of the valve from the position H of the controlling shaft to the position H', the opening of the charging air valve from the position F of the controlling shaft to the position F' and the closing of the charging air valve from the position K of the controlling shaft to the position K'. Having regard to the regulating stroke, therefore, the pitch or inclination of the control edges is given by the distances apart of the individual phases projected on the periphery of the distributor, and taking into account the range of regulation. It will be understood that the use of a distributor which must be axially displaced in order to allow the various controlling points of the regulating spiral to become effective has been indicated solely by way of example and the invention is not limited thereto. In a kinematic reversal of the parts of the controlling mechanism the parts or connections which co-act with the edges of the controlling spiral or spirals could be displaced instead of such spiral or spirals, or both such connections and spirals could be displaceable.

Figure 4:
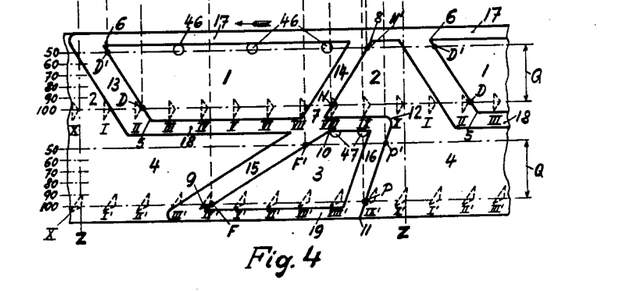
Fig. 4 shows a development of a distributor surface of which the controlling points are arranged in accordance with Fig. 3.

Fig. 4 shows the development of a distributor in which the controlling blocks or enlargements corresponding to the type of members to be actuated by the pressure medium are arranged axially one behind the other and have the form of helices on the distributor. There are illustrated in dotted lines the mouths of the pressure medium inlet and outlet conduits which lead to the nozzle valves and charging air valves of the explosion chambers or lead away therefrom; it is assumed in this case that an explosion turbine having 10 explosion chambers is to be regulated. The connections for the nozzle valves are indicated by I—X, the connections for the charging air-valves are indicated by I'—X'. The general construction of the distributor is known per se; the distributor chamber, which is in connection with the controlling members to be immediately actuated, is continuously connected with the inlet for the pressure medium while the other distributor chamber which is in connection with the controlling members which are not actuated is not accessible to the pressure medium.

In Fig. 4 in the distributor section provided for the control of the nozzle valves, 1 indicates the pressure chamber and 2 the suction chamber which is shut off from the pressure medium. In the section for the control of the charging air valves, 3 is the pressure chamber while 4 indicates the suction chamber which is shut off from the pressure medium. If it be assumed that the distributor is to make a regulating movement or stroke of the amount Q over the range of regulation, then the edge 5, 6 which controls the admission of the pressure medium to the nozzle valves must run correspondingly to the line D, D' of Fig. 3. By suitably constructing the controlling device of the nozzle valve and by suitably dimensioning the conduits and the pressure of the pressure medium the result is obtained that after the admission of the pressure medium to the nozzle valves according to the edge 5, 6, measured always over the entire range of regulation, the full opening of the nozzle valve actually takes place along the line M, M' of Fig. 3. The same holds good for the edge 7, 8 which corresponds to the line N, N' of Fig. 3. Then as soon as the controlling edge 7, 8 slides over the connections leading to the nozzle valves such connections are placed in communication with the chamber 2 and are released from pressure so that the nozzle valve begins to close. The aforesaid determining conditions are again fixed in such a manner that the complete closure of the nozzle valve actually takes place according to the line H, H' of Fig. 3. As soon as the edge 5, 6 having the characteristic of the line D, D' of Fig. 3 passes over the connection of a nozzle valve, the opening of the nozzle valve is regulated in such a manner that, in combination with the control of the closure of the nozzle valve by the edge 7, 8 having the characteristic of the line N, N' of Fig. 3 and in combination with the corresponding control, hereinafter referred to, of the charging air valve by the interposition of the correct ineffective and inoperative interval of time l' and with the regulation of the speed of the distributor, the number of cycles per minute is regulated to that at which the output of the turbine just corresponds to the load on the turbine while the duration of the individual working or process phases is substantially unaltered. Similar considerations of course apply to the distributor section provided for the control of the charging air valve. The controlling edge 9, 10 has the characteristic of the line F, F' of Fig. 3, the controlling edge 11, 12 has the characteristic of the line P, P' of Fig. 3. The pressure chamber 3 thus controls the charging air valve during the different numbers of cycles per minute in the manner determined by Fig. 3 and supplements the control of the nozzle valves effected by the upper section of the distributor. For controlling the members to be actuated by the pressure medium the distributor makes a rotary movement, whereas for regulating the controlling movement it is given an upward and downward movement. The controlling edges 5, 6, 7 8, 9 10 and 11 12 are formed by blocks or enlargements 13 14, 15 16, which in combination with the closure edges 17, 18, 19 form the chambers 1, 2, 3, 4 between the face of the distributor and the wall of the casing in which the distributor rotates. Fig. 4 shows the position of the distributor which just corresponds to a number of cycles of 100 per minute. The nozzle valves of the chambers III, IV, V, VI, VII are open and those of the chambers IX, X, I and II are closed. The nozzle valve of the chamber VIII is already in the process of being closed while in the next moment the nozzle valve of the chamber II begins to open. Further the charging air valves of the chambers V, VI, VII and VIII are open whereas those of the chambers X, I, II, III and IV are closed, that of the chamber IX is just beginning to close, while in the next moment the charging air valve of the chamber IV will be opened. If the adjustment of the distributor at the moment illustrated were made by hand or by the governor it is clear that the moment at which the individual valves are controlled would be altered, so that according to the diagrams of Figs. 1 to 3 the number of cycles would be reduced in correspondence with the decreasing loading without the operating process itself and its efficiency being varied.

Figs. 11 to 15 illustrate diagrammatically the characteristics of the fuel pump at different cycle frequencies and also its main constructional features. Fig. 11 shows again the diagram of Fig. 2 without the valve lifting diagrams shown in such figure. The diagram shown in full lines applies to a process of 100 cycles per/min. while the diagram shown in dotted lines is for 50 cycles per/min.

Figure 12:
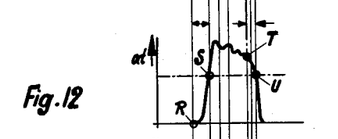

Fig. 12 illustrates the fuel pressure diagram when the explosion chamber operates at 100 cycles per/min. The regulation of the fuel pump occurs at the point R. At the point S the fuel in the pump space reaches the pressure which corresponds to the pressure of the spring of the injector valve which is shown by the horizontal dot and dash line. The introduction of fuel into the chamber thus begins at the point S. At the point T the reverse control impulse occurs whereby the fuel pressure begins to fall and at the point U has dropped to the value which corresponds to the pressure of the spring of the injector valve. The introduction of fuel thus ends at the point U.

Figure 13:
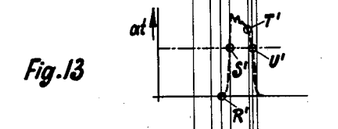

Fig. 13 shows a corresponding fuel pressure diagram for 50 cycles per/min. The regulation in this case occurs at the point R', the feed of the fuel begins at S', the reverse control impulse occurs at T' and the introduction of fuel ends at U'. The control points of Figs. 13 and 12 have been projected by vertical lines upon the diagrams of Fig. 11 in order to illustrate the time position of the points in such diagrams. The latter show that, simultaneously with the regulation of the valves acording to Figs. 2 to 4, a corresponding regulation of the beginning and ending of the fuel feed must be provided. For example, upon a change from 100 to 50 cycles per/min. the initial control point of the fuel pump must be shifted from the position R to the position R', the beginning of the fuel feed from the position S to the position S', the initiation of the reverse control movement from T to T' and the end of the fuel feed from U to U'.

Figure 14:
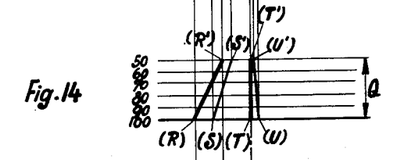

Fig. 14 shows how the control points of the control apparatus must be arranged. The same considerations apply for Fig. 14 as for Fig. 3. Assuming that the cycle numbers of 100 and 50 represent the limits of regulation, the edge of the control member in the illustrated development of the distributor periphery (Fig. 14) runs in a straight line from R to R', while the edge which initiates the reverse control movement runs from T to T'. It should be noted that the latter line happens to be a vertical one for the reason that the instant of the beginning of the reverse control impulse coincides with the ignition point which was selected as a reference point. There are also shown in Fig. 14 the lines S, S' and U, U' which indicate the time function of the actual beginning and end of the fuel feed over the regulation range of 100 to 50 cycles.

Figure 15:
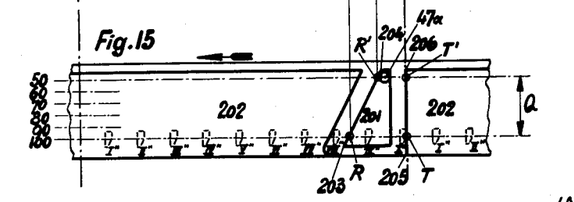

Fig. 15 shows a construction of the control stages of an oil distributor constructed in accordance with the invention wherein the regulation occurs through axial adjustment of the distributor. The section 201 is supplied with oil under pressure through the bore 47a, while the section 202 is open at the bottom and thus permits the pressure oil coming from the conduits to flow away. The line 203-204 represents the control edge which provides the initial control impulse. At 100 cycles per/min. this initial impulse occurs at the point R, while at 50 cycles it occurs at the point R'. The edge 205-206 determines the instant at which the reverse control impulse begins. The point T for 100 cycles per/min. and the point T' for 50 cycles per/min. lie vertically above each other for the reason given above so that this point actually is not displaced. In other respects what has been said with regard to Fig. 4 applies also to Fig. 15.

Figure 5:
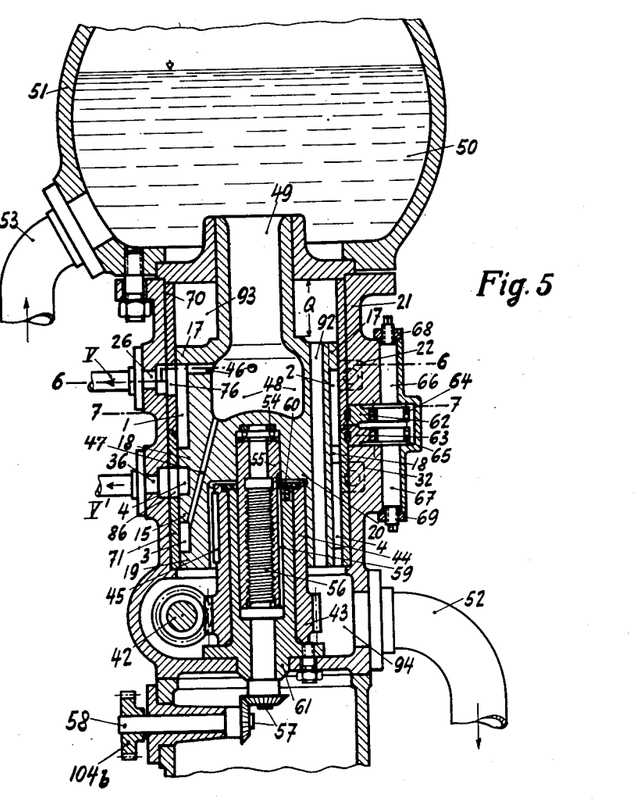
Fig. 5 is a vertical longitudinal section on the line 5—5 of Fig. 6 of an example of an apparatus by which the method in accordance with the invention can be carried out.
Figure 6:
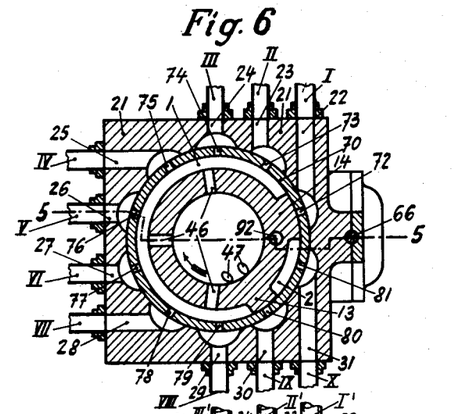
Figs. 6 and 7 are horizontal cross-sections through the apparatus taken on the lines 6—6 and 7—7 of Fig. 5.
Figure 7:
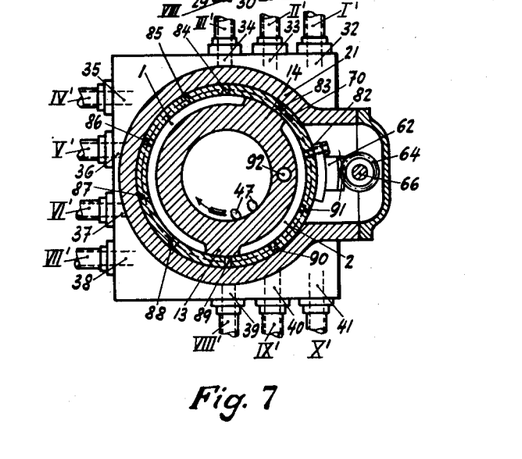
Figure 8:
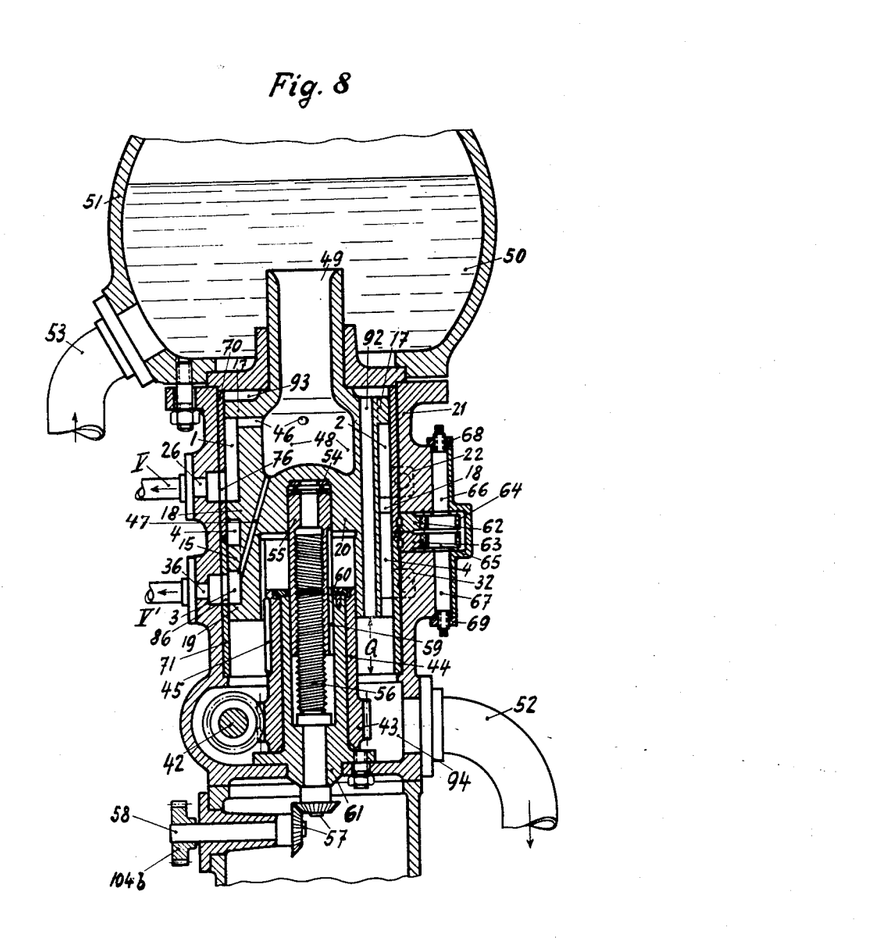
Fig. 8 shows the apparatus according to Fig. 5 in another condition of regulation.

Figs. 5 to 8 show the actual construction of the controlling and regulating apparatus. Whereas Figs. 5 to 7 illustrate the apparatus in a condition of regulation of 50 cycles, that is to say with the distributor fully lowered, Fig. 8 shows the position of the distributor for a condition of regulation of 100 cycles per minute. The distributor 20 which carries the helical controlling blocks or enlargements is revolubly mounted in a casing 21 which contains the connections 22 to 31 inclusive (Fig. 6) of the pipes leading to the nozzle valves as well as the connections 32 to 41 inclusive (Fig. 7) of the pipes leading to the charging air valves. It is driven from a worm-shaft 42 by way of the worm wheel 43 and the sleeve 44 on which it is mounted so as to be longitudinally displaceable and by which it is carried around through the agency of a key 45. The pressure medium is conducted to the chambers 1 and 3 by way of passages 46, 47 from the hollow space 48 inside the distributor. The hollow space 48 is connected by means of a hollow pivot 49 with the pressure liquid 50 which is stored in the air-vessel 51. A pump which is not illustrated in the drawings returns the decompressed medium, which is discharged from the controlling and regulating apparatus through the pipe 52, to the vessel 51 under pressure through the pipe 53.

In order to be able to effect the advance or retardation of the opening or closing of the nozzle valves and charging air valves relatively to the rotary movement which effects the periodic opening or the periodic closing of the controlled apparatus in accordance with the different conditions of regulation, as is necessary in carrying out the regulating method in accordance with the invention, the following apparatus is provided for carrying the invention into effect. The distributor 20 rotates on thrust bearing 54 which is arranged on the face of a hollow spindle 55. The hollow spindle is provided with an internally threaded bore in which the threaded spindle 56 is guided. The threaded spindle 56 can be rotated by hand or by the governor or by other means through the agency of bevel gears 57 and a gearing shaft 58. Since the hollow spindle 55 is prevented by means of a groove 59 and key 60 on the guide bush 61 from rotating with the threaded spindle 56, it moves upwards and downwards within the bush and thereby simultaneously displaces the distributor into its various positions within the limiting stroke Q. In the illustration according to Fig. 5 the distributor is lowered to its full extent so that controlling points become effective which corresponds to the points D' and N' on the one hand and to the points F' and P' of Fig. 4 on the other hand; that is to say, Fig. 5 shows the condition of regulation for 50 cycles per minute. In contra-distinction thereto Fig. 8 shows the highest position of the distributor, wherein those controlling points become effective which correspond on the one hand to the points D, N and on the other hand to the points F, P of Fig. 4; that is to say, Fig. 8 shows the condition of regulation for 100 cycles per minute. Since the condition of regulation of 100 cycles per minute is the normal condition in which the turbine delivers its full output or can take the full load, Fig. 8 illustrates the normal condition of the distributor. Between these two positions lie all conditions of regulation by which the decreases in load which occur can be balanced.

Between the distributor 20 and the casing 21 there are arranged sleeves 70 and 71 which are independently rotatable by means of toothed arcs 62, 63, toothed wheels 64, 65, regulating shafts, 66, 67 and fixing devices 68, 69 by means of which the moments of inflow and outflow of pressure medium are adjustable in common and in similar manner for each kind of controlling member to be actuated, since the edges of the bores 72 to 81 inclusive and 82 to 91 inclusive directly co-act with the effective controlling edges of the distributor spiral. The connections 22 to 31 inclusive and 32 to 41 inclusive are suitably cut back or enlarged in order not to interfere with the pre-adjustment of the moment of opening and closing, which is effected in common and in a similar manner by way of the sleeves 70 and 71, for each kind of member to be actuated. A pre-adjustment of this nature is necessary, for example for the nozzle valves, if a difficultly ignitable fuel is to be burned in the explosion chamber. In this case the period of substantially constant pressure (c), or (c′) in Figs. 1 and 2 is somewhat increased, in order that the fuel may be prepared for ignition and combustion by greater radiation of heat from the walls of the chamber. There are provided in the body of the distributor 20 passages 92 running parallel to the axis in order to connect the chambers 93 and 94 so that the alterations in the length of the distributor body 20 which occur when carrying out the regulating process shall effect no pumping action in the chamber 93.

In describing the characteristic features of the distribution the constant speed regulation has principally been considered. The invention is however not essentially altered, if a regulation of output under variable turbine rotor speed is effected as is necessary, for example, when using the explosion turbine for marine purposes; in such case manual regulation of the cycle number may be resorted to. Further, the regulating method of the invention can be combined with another regulating process, if the necessity for this arises, without departing from the invention.

Figure 9:
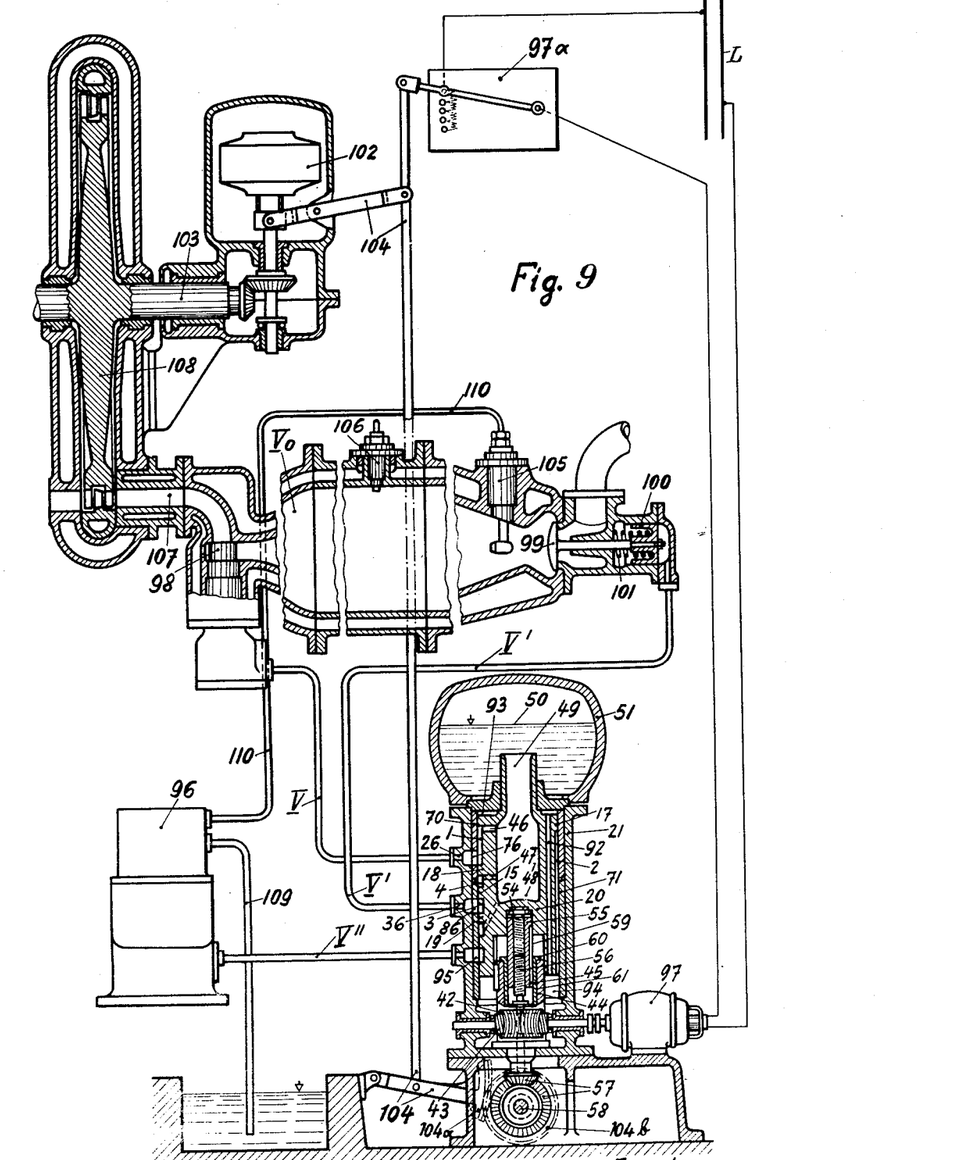
Fig. 9 is a diagrammatic view of a complete installation in which the regulating method in accordance with the invention is carried out.

Finally, Fig. 9 shows the complete installation for carrying out the regulating method proposed in accordance with the invention. In particular, Fig. 9 shows the cooperation of the distributor with the valves and controlling members of an explosion chamber $V_0$, which is illustrated by way of example as an embodiment of one of the explosion chambers $I_0$—$X_0$ of an explosion turbine. In this figure the distributor is provided not only with two sections for controlling the nozzle valve and the charging air valve corresponding to the illustrations of Figs. 2–8, but it is provided with a further section having a connection 95 for controlling the fuel pump 96, since obviously with the alterations in the opening and closing of the nozzle and charging air valves a synchronous alteration in the moments at which the fuel pump admits fuel to the explosion chambers must take place. The distributor section assigned to the connection 95 is formed similarly to the distributor sections for controlling or regulating the nozzle and charging air valves.

Thus, at the moments determined by the regulating process, the rotary distributor 20 which is rotated by a variable speed electric motor 97 through the agency of the worm shaft 43 and worm wheel 42 produces regulating impulses through the pipe V on the nozzle valve 98, through the pipe V′ on the air valve 99, and through the pipe V″ on the fuel pump 96, which, according to the cycle of operations to which the installation has been regulated, effect the opening or closing of the nozzle valve and of the charging air valve, or the beginning and ending of the injection of fuel. The valves 98 and 99 are controlled in known manner in that the controlling impulse is used to place a piston 100 in the valve casing under pressure or to relieve it from pressure. The valve 99, when the valve piston 100 is placed under pressure, opens against the action of the spring 101 so that charging air flows in to the chamber. If the controlling pipe V′ is relieved from pressure upon connection with the exhaust space 94 of the distributor, the valve 99 closes under the action of the spring 101. What has been said concerning the valve 99 applies also to the valve 98 of the explosion chamber $V_0$ and for the nozzle valves and charging air valves of the remaining chambers $I_0$–$IV_0$ and $VI_0$–$X_0$.

The rise and fall of the distributor 20 is effected by the governor 102 which is driven from the turbine shaft 103. The lever and linkage 104 transmit the movements of the governor to the shaft 58 through a gear segment 104a which engages gear 104b on the shaft 58 which through the gearing 57 rotates the worm 56 so that the distributor 20 moves upwards or downwards in correspondence with the movements of the governor and thereby alters the regulation of the controlling members 96, 98 and 99 of each explosion chamber in accordance with the method of regulation proposed by the invention.

In place of the mechanism 104, a relay mechanism may be arranged to be controlled by the governor. The speed of the motor 97 may be simultaneously regulated in correspondence with the axial adjustment of the distributor by means of a rheostat 97a electrically connected with the line conductors L and with the motor 97 and arranged to be operated by the mechanism 104. An ignitable mixture formed upon the opening of the charging air valve 99 and the fuel inlet valve 105 at the correct moments is ignited in the usual manner by an ignition device 106. The nozzle valve 98 which is controlled by the distributor 20 opens at the correct moment depending on the condition of regulation. The highly compressed, highly heated combustion gases so generated impinge through the nozzle 107 on the rotor 108 of the turbine, which is constructed as a Curtis wheel with two sets of blades. The shaft 103 delivers the output of the turbine externally as mechanical output. The combustion gases are either exhausted or if they are not yet fully exhausted they are conducted to following turbine stages. Their thermic and pressure energy can however be utilized in any other suitable manner. The fuel pump draws the fuel through the pipe 109 and supplies the fuel which has been compressed through the pipe 110 to the fuel inlet valve 105.

Figure 10:
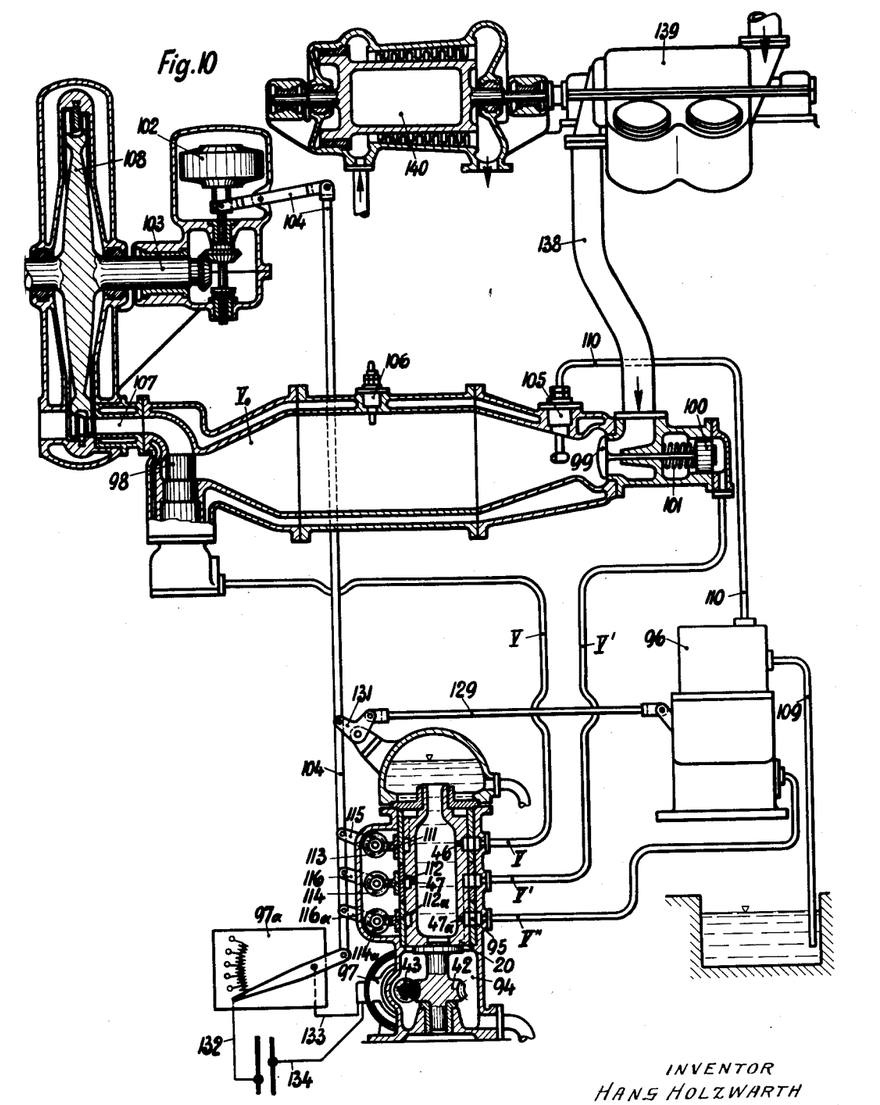
Fig. 10 is a view similar to Fig. 9 but embodying a modification of the invention; while Figs. 11 to 15 inclusive are diagrams relating to the construction and operation of the fuel pump.
Figure 11:
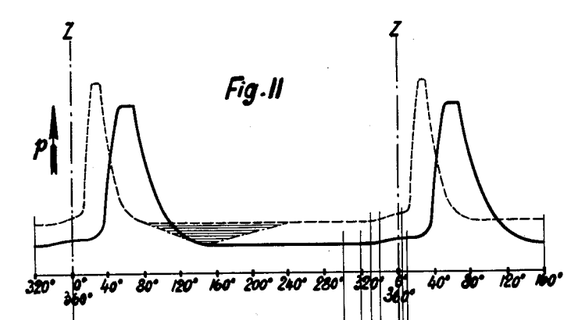

Fig. 10 shows a modified form of distributor in which adjustment of the controlling points, or the instants of opening and closing of the valves, is effected by rotation of bushes similar to the bushes 70 and 71 shown in Fig. 5. In Fig. 10 the bushes 111, 112 and 112a are arranged to control the opening of the nozzle valve 98, of the air valve 99 and of the fuel pump 96 so as to vary the time period allotted to the corresponding phases of the process. The bushes are provided with gear segments which are in mesh with gears 113, 114 and 114a whose shafts are rigid with levers 115, 116 and 116a controlled by mechanism 104 similar to that shown in Fig. 9. It will be understood that in the construction of Fig. 10 the distributor is not adjusted axially.

The adjustment of the control points corresponding to the change of the cycle number is obtained through the governor 102 which is driven from the turbine shaft 103 and actuates the levers 115, 116 and 116a through the linkage 104. These levers operate upon worm wheels 113, 114 and 114a having different inclinations and thus accomplish an exact pre-determined rotation of the bushings 111, 112 and 112a corresponding to the desired adjustment of the control points. In this way the same effect is obtained as with the device of Fig. 9 where the distributor is axially adjustable.

The fuel pump 96, which is shown in greater detail in Fig. 16, is actuated in such manner by the pressure oil controlled by the distributor through the conduit V" that such oil enters under the piston 117 and raises the latter against the pressure of the spring 118. The pressure plunger 119 thereby forces the fuel located in the space 120 into the fuel injector 105 through the pump outlet valve 121. As soon as the distributor is relieved of the oil pressure in the conduit V", the spring 118 forces the piston 117 back and the plunger 119 sucks in new fuel from a conduit 109 through the suction valve 122. This pump is disclosed in all essential details in Fig. 197, page 188, of "Oel- und Gas Maschinen" by Professor Heinrich Dubbel, published by Julius Springer, Berlin 1926, Fig. 16 differing from the illustration in this book merely in the fact that, instead of the cam actuation of the pump, Fig. 16 shows a hydraulically operated piston, as disclosed in my United States Patent No. 1,763,154, dated June 10, 1930.

The quantity of fuel fed at any time is so related to the quantity of air that the heat content of the mixture remains constant. To this end there is provided an overflow valve 123 which is controlled by the lever 125 through the linkage 124. The lever 125 is actuated by the piston 117 so that at the point 125a the rod 126 strikes against the rod 127. The instant of opening of the overflow valve 123 determines the end point of the fuel feed as the overflow valve permits the fuel to return to the suction conduit. The moment of the opening of overflow valve 123 is adjusted by displacement of the pivot 128 of the lever 125. The pivot 128 is located upon an eccentric which is adjusted by the rod 129 through the lever 130. This adjustment is likewise accomplished by the linkage 104 which is actuated by the governor 102 with the aid of lever 131. The lever and eccentric are so related that the quantity of fuel varies in the same degree as the change in the feed of air in consequence of the adjustment of the sleeve 112.

The regulating linkage 104 acts further upon the resistance 97a. Through this resistance and conductors 132, 133 and 134 electric current flows to the motor 97 which drives the oil distributor. In this way the governor controls the speed of revolution of the oil distributor by regulating the resistance 97a. The correlation of the speed of the oil distributor and the adjustment of the sleeves 111, 112 and 112a occurs in such manner that the control phases are maintained constant in the above described manner.

Behind the rotor 108 of the explosion turbine there is arranged a rotor 135 driven by a continuous stream of gas. Control valves 136 are arranged in advance of the rotor 135 and permit the pressure in the exhaust conduit 137 to be maintained constant so that the counter pressure of the explosion turbine is not altered.

The combustion supporting air is conducted to the explosion chambers of the explosion turbine by the conduit 138 and is supplied by a centrifugal compressor 139 which supplies air of practically constant pressure even when the amount withdrawn varies. This compressor is driven by a steam turbine 140, or in any other suitable way.

I claim:

1. The combination with a constant volume explosion chamber having pressure fluid-controlled inlet and outlet members, of a rotary distributor for controlling said members periodically, said distributor comprising a rotary element provided with a spiral enlargement along whose edges the effective control points of a controlled member lie, and means for displacing said rotary element axially whereby the advance or retardation of the controlling edges relatively to the rotation of the distributor may be varied.

2. The combination as set forth in claim 1, wherein the inclination of the controlling edges is determined by the adjusting stroke and by the distance apart projected upon the periphery of the distributor, of two corresponding control points.

3. The combination according to claim 1, wherein controlling enlargements are arranged on the distributor axially one behind the other in sections according to the kind of members to be actuated by the pressure medium.

4. The combination as set forth in claim 1, wherein adjustable bushes are arranged between the casing for the connection of the conduits for the pressure medium and the rotary distributor, said bushes adapted to adjust the moments of charge and discharge of the pressure medium for each controlled member.

5. The combination with a constant volume explosion chamber having pressure fluid-controlled inlet and outlet members, of a rotary distributor for controlling said members periodically, said distributor comprising a rotary element having an enlargement thereon, a stationary cylinder having openings therein conduits leading from said openings to said members, a bush between said element and cylinder and provided with openings adapted to register with said first-mentioned openings, and means for adjusting said bush circumferentially.

6. The combination with a constant volume explosion chamber having nozzle and air valves adapted to be controlled by a pressure medium, of mechanism for regulating the cycle frequency of such chamber comprising a movable distributor having control edges determining the flow of said pressure medium to said valves to actuate the same, said control edges being displaceable with respect to the direction of movement of the distributor.

7. The combination with a constant volume explosion chamber having nozzle and air valves adapted to be controlled by a pressure medium, of mechanism for regulating the cycle frequency of such chamber comprising a movable distributor having inclined control edges determining the flow of said pressure medium to said valves to actuate the same, and adjustable transversely to their direction of movement, whereby the controlled valves are opened or closed earlier or later according to the inclination of the edges and to the direction of adjustment.

8. Apparatus according to claim 1 wherein the distributor is provided with a plurality of spiral enlargements along whose edges the effective control points of the controlled members lie, the inclination of the control edges being different for the different control phases.

9. Apparatus according to claim 1 wherein the distributor is provided with a plurality of spiral enlargements along whose edges the effective control points of the controlled members lie, and wherein within a cycle considered from the end of an expansion to the end of the next expansion the inclination increases constantly from control edge to control edge so that the duration of a control phase remains constant at all cycles and the variable pause lies between the end of an expansion and the air valve opening of the next cycle.

10. Apparatus according to claim 1 wherein the inclination of a control edge of the adjustable distributor is determined by the total lift of the distributor and by the distance, projected upon the surface of the distributor, of the associated control points in the pressure-time diagrams corresponding to the greatest and the smallest cycle frequencies determining the range of control.

11. The combination with a pistonless, constant volume explosion chamber having controllable inlet and outlet members, of mechanism for controlling said members periodically, comprising a movable timing member associated with said valves to determine the instants of opening and closing of such valves, said timing member provided with a plurality of spiral enlargements along whose edges the effective control points of the controlled members lie, the inclination of the control edges being different for the different control phases, means for moving said timing member, and means for displacing said control edges with respect to the direction of movement of the timing element.

12. The combination with a pistonless, constant volume explosion chamber having controllable inlet and outlet members, of mechanism for controlling said members periodically, comprising a rotatable timing member associated with said valves to determine the instants of opening and closing of such valves, said timing member provided with a plurality of spiral enlargements along whose edges the effective control points of the controlled members lie, the construction of said enlargements being such that, within a cycle considered from the end of an expansion to the end of the next expansion, the inclination increases constantly from control edge to control edge, so that the duration of a control phase remains constant at all cycles, and a variable pause is inserted between the end of an expansion and the air valve opening of the next cycle.

13. The combination with a pistonless, constant volume explosion chamber having controllable inlet and outlet members, of mechanism for controlling said members periodically, comprising a movable timing member associated with said valves to determine the instants of opening and closing of such valves, and means for adjusting said timing member, said timing member being provided with a plurality of spiral enlargements along whose edges the effective control points of the controlled members lie, the inclination of a control edge of the timing member being determined by the total adjusting movement of the timing member, and by the distance, projected upon the surface of the timing member, of the associated control points in the pressure-time diagrams corresponding to the greatest and the smallest cycle frequencies determining the range of control.

HANS HOLZWARTH.